United States Patent [19]

Lyga

[11] Patent Number: 5,802,808
[45] Date of Patent: Sep. 8, 1998

[54] ENVELOPE THROAT OPENING MECHANISM FOR INSERTING MACHINE

[75] Inventor: Thomas M. Lyga, Torrington, Conn.

[73] Assignee: Pitney Bowes Inc., Stamford, Conn.

[21] Appl. No.: 895,871

[22] Filed: Jul. 17, 1997

[51] Int. Cl.$^6$ .............................. B65B 43/26; B65B 43/34
[52] U.S. Cl. ............................................. 53/381.5; 53/569
[58] Field of Search .................................. 53/569, 284.3, 53/460, 459, 468, 469, 381.5, 381.7

[56] References Cited

U.S. PATENT DOCUMENTS

| | | | |
|---|---|---|---|
| 2,914,895 | 12/1959 | Martin ....................................... | 53/569 |
| 4,418,515 | 12/1983 | Foster et al. .............................. | 53/457 |
| 4,926,612 | 5/1990 | Krasuski et al. ........................ | 53/284.3 |
| 5,168,689 | 12/1992 | Macelis ..................................... | 53/569 |
| 5,255,498 | 10/1993 | Hotchkiss et al. ........................ | 53/569 |
| 5,430,990 | 7/1995 | Long .................................. | 53/284.3 X |
| 5,630,312 | 5/1997 | Ballard et al. ............................ | 53/569 |

*Primary Examiner*—Horace M. Culver
*Attorney, Agent, or Firm*—Charles R. Malandra, Jr.; Melvin J. Scolnick

[57] ABSTRACT

An envelope throat opening mechanism for an envelope inserting machine includes a pair of envelope throat opening claw assemblies mounted adjacent an envelope inserting position for opening the outer ends of an envelope disposed in the envelope inserting position to permit insert material to be inserted into the envelope. An envelope throat opening tongue assembly is also disposed adjacent the envelope inserting position and in substantial alignment with the center of an envelope, the tongue assembly having a tongue mounted therein for movement into the throat of the envelope adjacent the center thereof to ensure that the center portion of the throat is opened sufficiently to permit the insert material to be inserted into the envelope. There is means for driving the claw assemblies and the tongue assembly in a timed sequence with the arrival of an envelope at the inserting position, so that both the outer ends of the envelope and the center portion thereof are effectively opened by the claw assemblies and the tongue assembly respectively.

14 Claims, 13 Drawing Sheets

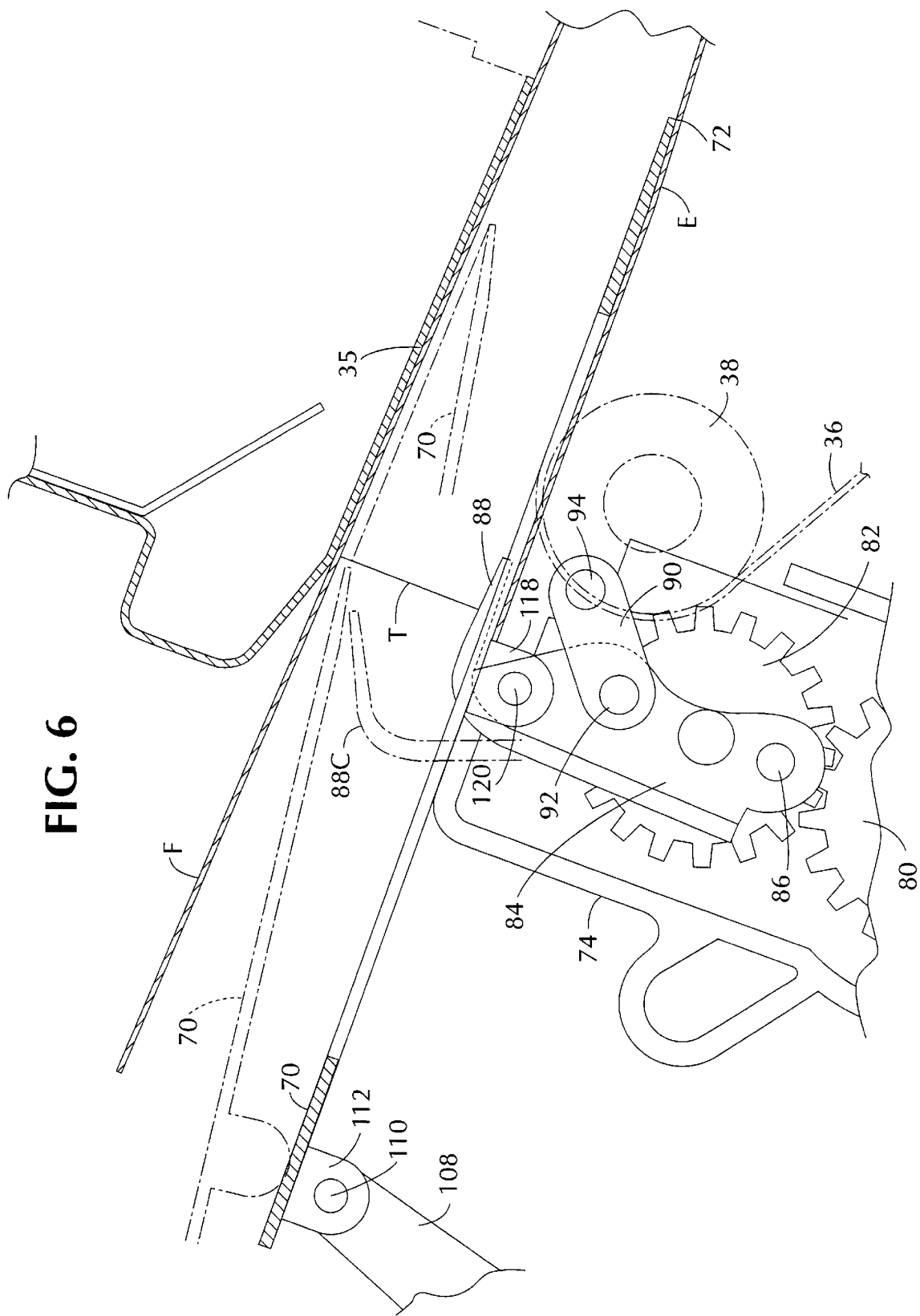

ENVELOPE THROAT OPENING MECHANISM FOR INSERTING MACHINE

BACKGROUND OF THE INVENTION

The present invention relates generally to the field of machines for inserting material into envelopes, and more particularly to an improved mechanism for opening the throats of envelopes disposed at an inserting position to permit collations of insert material to be inserted into the envelopes.

Envelope inserting machines have long been well known and have been developed in a variety of configurations ranging from relatively small, low volume table top machines, to large, console type machines capable of inserting material into envelopes at a high volume rate. A typical envelope inserting machine comprises an envelope storage and feeding mechanism which feeds envelopes successively from a storage tray to an inserting location which is disposed in alignment with the feed path of collations of insert material being fed into the inserting machine from a variety of upstream collating machines which form the collation of insert material.

A pair of envelope throat opening devices is disposed in the inserting machine adjacent the envelope inserting position. The throat opening devices have movable claws that are suitably driven, in timed relationship with the arrival of an envelope at the inserting position, through an orbital path of travel during which they enter the throat of an envelope disposed in the inserting location adjacent the outer ends of the envelope, and then pull downwardly on the upper edges of the rear surface of the envelope to open the throat to permit the collation of insert material to be inserted by a suitable inserting mechanism. After the insert material has been fully inserted into the envelope, it is conveyed out of the inserting machine for further processing as may be appropriate.

These machines have generally worked very well and have enjoyed considerable commercial success. However, experience has revealed an operational characteristic of these machines which causes a major problem under a variety of circumstances.

The problem is particularly vexing and costly when the inserting machine is a component of a larger document handling and processing system, such as a series of machines which are lined up and connected together to form a continuous path of travel for receiving basic documents in web form from a computer printer, slitting and accumulating discrete sheets of the documents, folding the sheets, adding insert material to the folded sheets to form collations, inserting the collations into envelopes, feeding the filled envelopes to and through a mailing machine for closing and sealing the envelopes and printing a postage indicia thereon, and finally stacking the envelopes for transport to a postal facility. The machines making up systems of this nature typically reach 15 to 20 feet in length and may cost many tens of thousands of dollars in total, in some cases even exceeding 100,000 dollars. Thus, it should be apparent that systems of this nature can be run on a cost effective basis only if they run continuously through a given job, without interruption or down time due to the failure of any single component in the system.

Thus, the problem to which the present invention is directed is that, under certain circumstances, the throat of an envelope is not opened sufficiently far for a particular collation of insert material to fully enter the envelope, thereby causing two major problems. One is that the insert can snag on a portion of the throat of the envelope, for example on the upper edge of the rear panel, and bend or rumple as it is driven through a throat that is only partly open, thereby causing a jam in the inserting machine as soon as it attempts to feed the envelope away from the inserting position. The other is that, even if the insert does not snag on a portion of the envelope, it may be sufficiently small in volume and formed of a light weight material, such as feeding a single check into a #10 envelope, that there is insufficient inertia in the insert to carry it fully into the envelope after it leaves the inserting mechanism, with the result that a portion of the insert remains projecting above the crease line between the front surface of the envelope and the flap. When this occurs, the envelope closing and sealing mechanism of the document handling and processing system cannot properly close the flap, thereby either causing a jam in the system or improperly closing and sealing the flap, usually sealing it to the contents of the envelope. It will be recognized that a jam in the inserting machine or in any other component in the system, causes that unit to shut down, which in turn stops the entire processing system until the jam is located and cleared, and the entire system reprogrammed and restarted, all of which results in considerable down time and commercially unacceptable cost of operation.

There are a number of situations in which the center portion of the throat of a particular envelope maybe not be fully opened by the outer claw assemblies. One is the physical condition of the envelope, in that it may be somewhat warped, buckled, bowed or otherwise curved when it is loaded into the envelope feeding component of the inserting machine, these conditions resulting from adverse atmospheric conditions, poor manufacturing, improper packaging, improper handling, or any combination of these factors. Another situation relates to physical characteristics of the envelope, such as the length, the relative stiffness of the material from which the envelope is formed, the shape of the rear panel adjacent the throat, whether the side panels are glued over or under the rear panel, etc. Thus, the longer the envelope, the more likely it is that the throat will not be fully opened by the outer claw assemblies regardless of which of the above characteristics may cause the throat not to be fully opened. Also, the outer claw assemblies may have more difficulty opening the center of the throat of an envelope formed from heavy, relatively stiff paper than it would with lighter weight, relatively thin paper. Conversely, some envelopes are made from paper that is so thin that normal pulling on the rear panel of these envelopes by the outer claw assemblies fails to fully open the center of the throats Further, the rear panels of some types of envelopes have either a deep V shape adjacent the upper edge, or have virtually no depression at all along the upper edge, either of which shape can result in the outer claw assemblies having difficulty in opening the throat wide enough to ensure full insertion of the insert material. Also, the nature in which the side panels are glued to the rear panel can have an adverse effect on the ability of the end claw assemblies to open a particular envelope, especially in combination with one or more of the other factors mentioned above.

Thus, it will be seen that there is a substantial variety of circumstances that can adversely affect the ability of the end claw assemblies to fully open the throats of envelopes, any of which can cause either of the above mentioned major problems which result in a total system shutdown.

BRIEF SUMMARY OF THE INVENTION

The present invention substantially obviates, if not entirely eliminates, the disadvantages and shortcomings of prior art envelope throat opening devices in envelope inserting machines, in attempting to eliminate the possibility of collations of insert material not being properly inserted into envelopes. The invention accomplishes this by providing a throat opening mechanism which has a center tongue assembly which opens the center portion of the throat of an envelope simultaneously with the action of the end claws assemblies in opening the end portions of the envelope throat, thereby ensuring that the entire length of the throat of an envelope is opened sufficiently to permit a collation of insert material to be fully inserted without snagging on any portion of the throat. This in turn ensures that the flap of the envelope can be properly closed so as to prevent the envelope from causing a jam in any downstream apparatus component through which the envelope is fed in the course of further processing.

In its broader aspects, the principles of the invention are embodied in an envelope throat opening mechanism for an envelope inserting machine which has means for storing a plurality of envelopes, means defining an envelope inserting position in spaced relationship with the envelope storing means and in which a collation of insert material is adapted to be inserted into the envelopes, and means for feeding envelopes seriatim from the storage means to the inserting position. In this environment, the envelope throat opening mechanism comprises a pair of envelope throat opening claw assemblies disposed in the envelope inserting machine adjacent the outer ends of the throat of an envelope in the inserting position, each of the claw assemblies having a claw mounted therein for movement into the throat of an envelope adjacent the outer ends thereof to open the throat to permit a collation of insert material to be inserted into the envelope. An envelope throat opening center tongue assembly is disposed in substantial lateral alignment with the center of the throat of an envelope in the inserting position for opening the center portion of the throat of an envelope positioned in the inserting position. There is means for driving the claw assemblies and the center tongue assembly in a timed sequence with the arrival of an envelope at the envelope inserting position, whereby the claw assemblies and the center tongue assembly open the entire length of the throat of the envelope to permit the collation of insert material to be fully inserted into the throat without interference from any portion of the throat.

In some of its more limited aspects, the center tongue assembly comprises an elongate, generally rectangular throat opening tongue having a forward edge that is positioned in substantial longitudinal alignment with the claws of the claw assemblies, and means mounting the tongue for compound movement such that the forward edge thereof moves into the throat of the envelope adjacent the center thereof in response to operation of the driving means for opening the center portion of the throat. The mounting means for the tongue comprises a four element linkage assembly in which all of the links are pivotally connected to form a parallelogram, the tongue constituting one of the links, and the parallelogram is pivotally connected to a portion of the frame of the inserting machine and driven is such a manner that the forward edge of the tongue moves in a prescribed orbital path to enter and open the throat of the envelope. More specifically, the four element linkage assembly comprises at least one lower link extending generally horizontally and being pivotally connected to the inserting machine adjacent the rear end of the link, a first upstanding link pivotally connected to the lower link at the pivotal connection thereof with the inserting machine, at least one second upstanding link pivotally connected to the lower link at an intermediate location spaced from the rear end of the lower link, and lastly, the link defined by the tongue being pivotally connected to the first and second upstanding links, such that the tongue is thereby supported for movement by the upstanding links.

The aforementioned claw assemblies and the four element linkage assembly are both driven from a common source, i.e., a drive shaft connected to the claw assemblies and also carrying a cam assembly which is interconnected with the first upstanding link for oscillating that link about the pivotal connection with the inserting machine frame for imparting horizontal reciprocating movement to the tongue. The cam assembly is also interconnected to the second upstanding link via the lower horizontally extended link for moving this link in a generally vertical direction so as to move the forward edge of the tongue in a vertical reciprocating movement. The cam assembly has cam traces that are customized to cause the forward edge of the tongue to move in the prescribed orbital path which moves the forward edge into the envelope and then downwardly to open the throat, and which also causes the forward edge to move into the envelope along a path that is substantially coextensive with the inner surface of the front panel of the envelope so that it gently scrapes along that surface while moving into the envelope.

Having briefly described the general nature of the present invention, it is a principal object thereof to provide an envelope throat opening mechanism for an envelope inserting machine which consistently and reliably avoids the problems encountered with prior art throat opening mechanisms when dealing with a variety of throat configurations and other physical characteristics of envelopes.

Another object of the present invention is to provide an envelope throat opening mechanism for an envelope inserting machine that opens the throats of successive envelopes being fed through the inserting machine sufficiently wide and across substantially the full length of the envelope to permit a collation of insert material to be inserted into the envelope without any portion of the envelope throat interfering with the movement of the collation.

It is another object of the present invention to provide an envelope throat opening mechanism for an envelope inserting machine that effectively opens the center portion of the throat of an envelope regardless of the configuration of the envelope throat or the depth of the throat throughout the broadest range of conventional commercial envelopes without the need for any adjustment of the center portion of the throat opening mechanism.

It is still another object of the present invention to provide an envelope throat opening mechanism for an envelope inserting machine in which the forward edge of a throat opening tongue element scrapes gently along the inner surface of the front panel of the envelope while entering the envelope to ensure that the upper edge of the throat is engaged and depressed by the tongue element.

It is a still further object of the present invention to provide an envelope throat opening mechanism for an envelope inserting machine which is inexpensive to manufacture, highly reliable in operation and requires little if any user maintenance.

These and other objects and features of the present invention will become more apparent from an understanding of the following detailed description of a presently preferred embodiment of the invention, when considered in conjunction with the accompanying drawings.

DESCRIPTION OF THE DRAWINGS

FIG. 6 is a side, partly sectional, view of the outer claw operatively engaged with an envelope as viewed in FIG. 2.

DETAILED DESCRIPTION OF THE INVENTION

Figure 1:
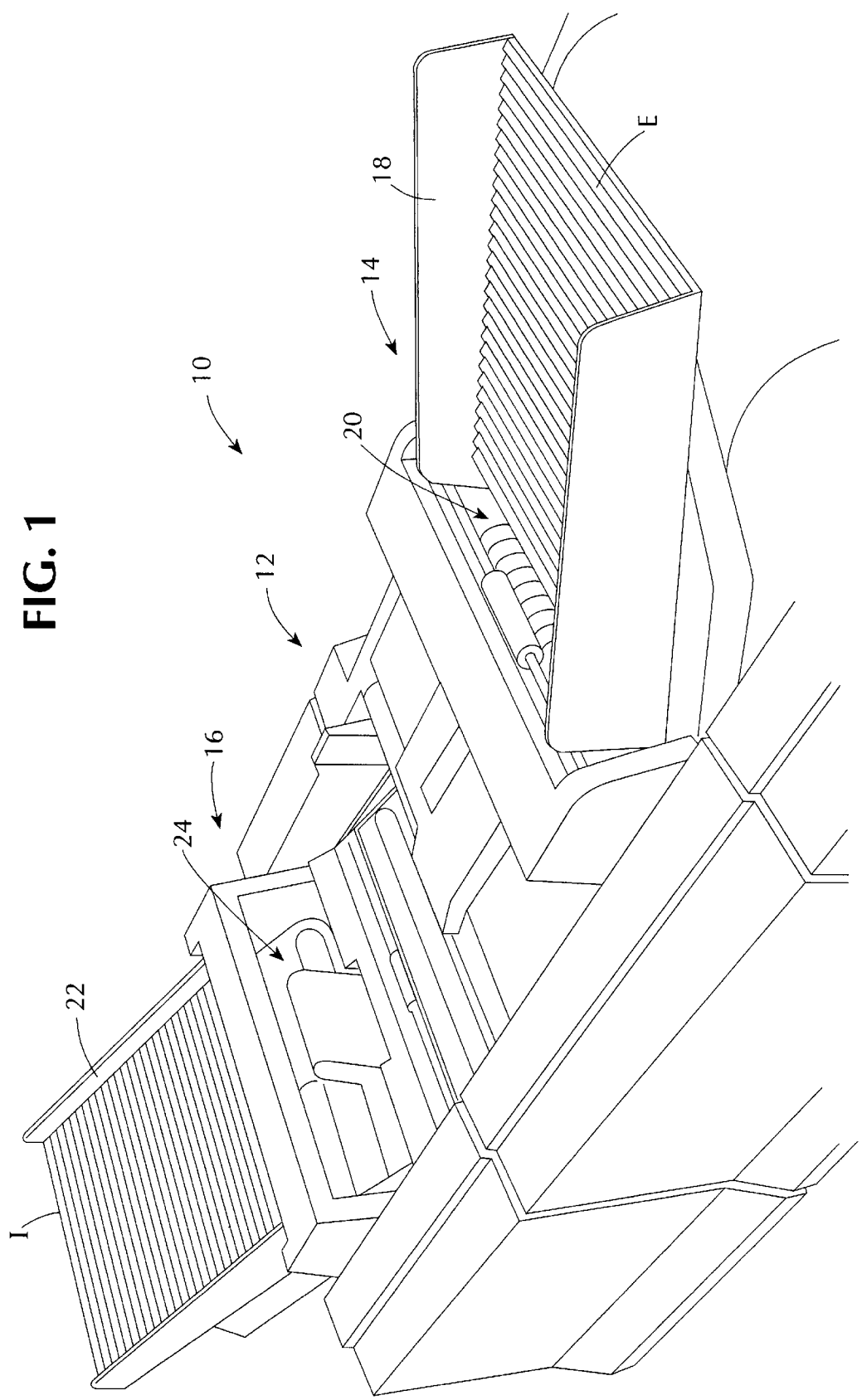
FIG. 1 is a perspective view of a typical envelope inserting machine showing an envelope inserting module with envelope and insert material storing, feeding and separating modules associated therewith, and which includes the novel envelope throat opening mechanism of the present invention.

Referring now to the drawings, and more particularly to FIG. 1 thereof, the envelope throat opening mechanism of the present invention is embodied in an envelope inserting machine, of which there are several types commercially available. For the purpose of showing the envelope throat opening mechanism of the present invention in an operative environment, FIG. 1 shows a typical arrangement of an envelope inserting machine, designated generally by the reference numeral 10, is shown in the figure and which includes an envelope inserting module, designated generally by the reference numeral 12, an envelope storing, feeding and separating module, designated generally by the reference numeral 14, and an insert material storing, feeding and separating module, designated generally by the reference numeral 16. It should be understood that the insert material module 16 is, again, merely representative of a large variety of insert material storing and/or feeding modules which are available and which can be suitably connected to and used with, either individually or in a successive arrangement, the envelope feeding and inserting modules 14 and 12 respectively.

The envelope storing, feeding and separating module 14 includes a suitable hopper 18 which holds a plurality of envelopes E in a fanned relationship so that successive envelopes can be grasped and fed by a suitable feeder/separator unit, designated generally by the reference numeral 20 to the envelope inserting module 12. Similarly, the insert material storing, feeding and separating module includes a suitable hopper 22 which holds a plurality of insert material I in a fanned relationship so that successive items of insert material can be grasped and fed by another suitable feeder/separator unit to the envelope inserting module 12.

Figure 2:
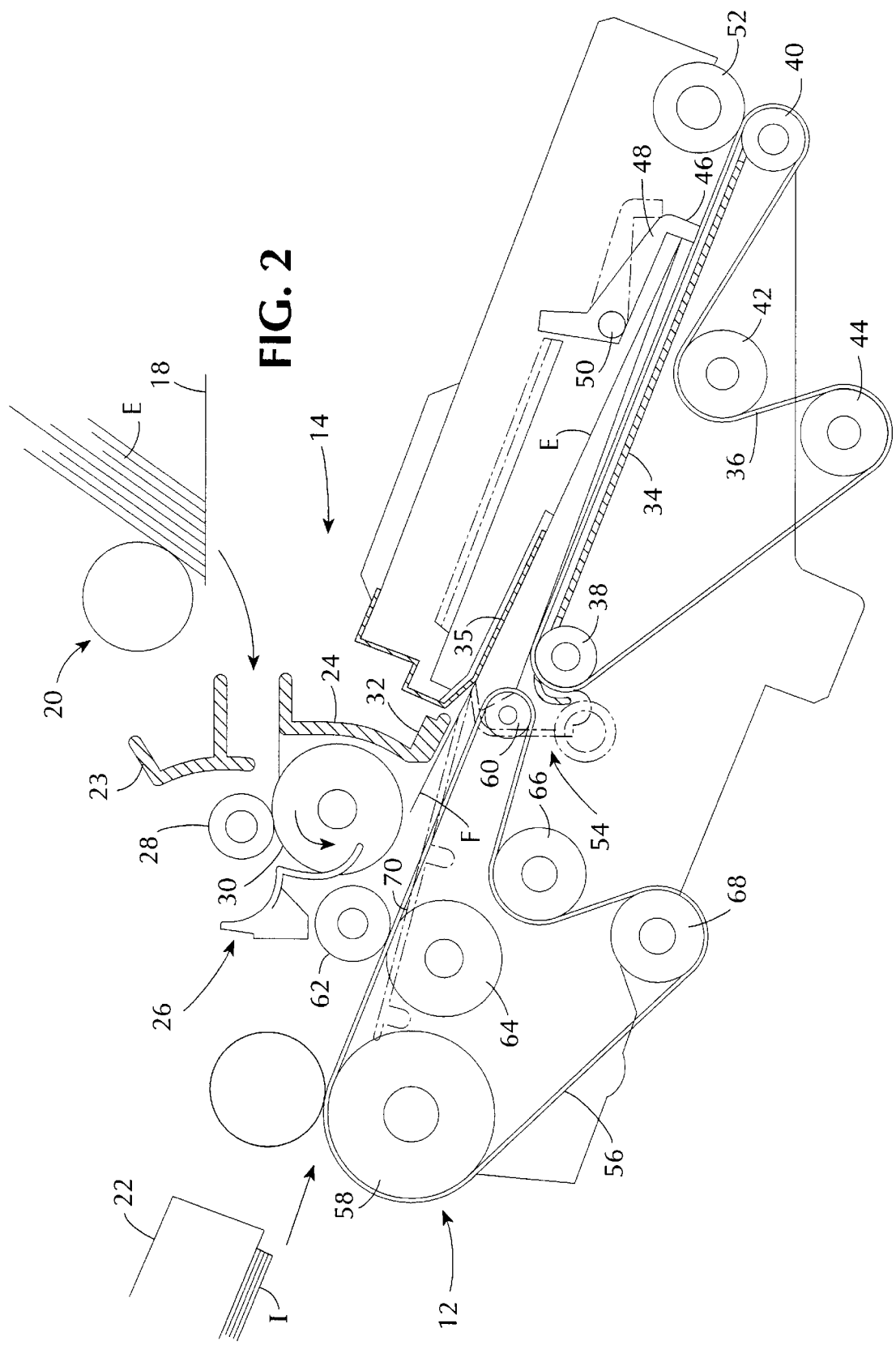
FIG. 2 is a fragmentary side, partly sectional, view of the envelope inserting machine shown in FIG. 1 with certain portions removed to show internal detail, and showing an envelope in the envelope inserting position.
Figure 3:
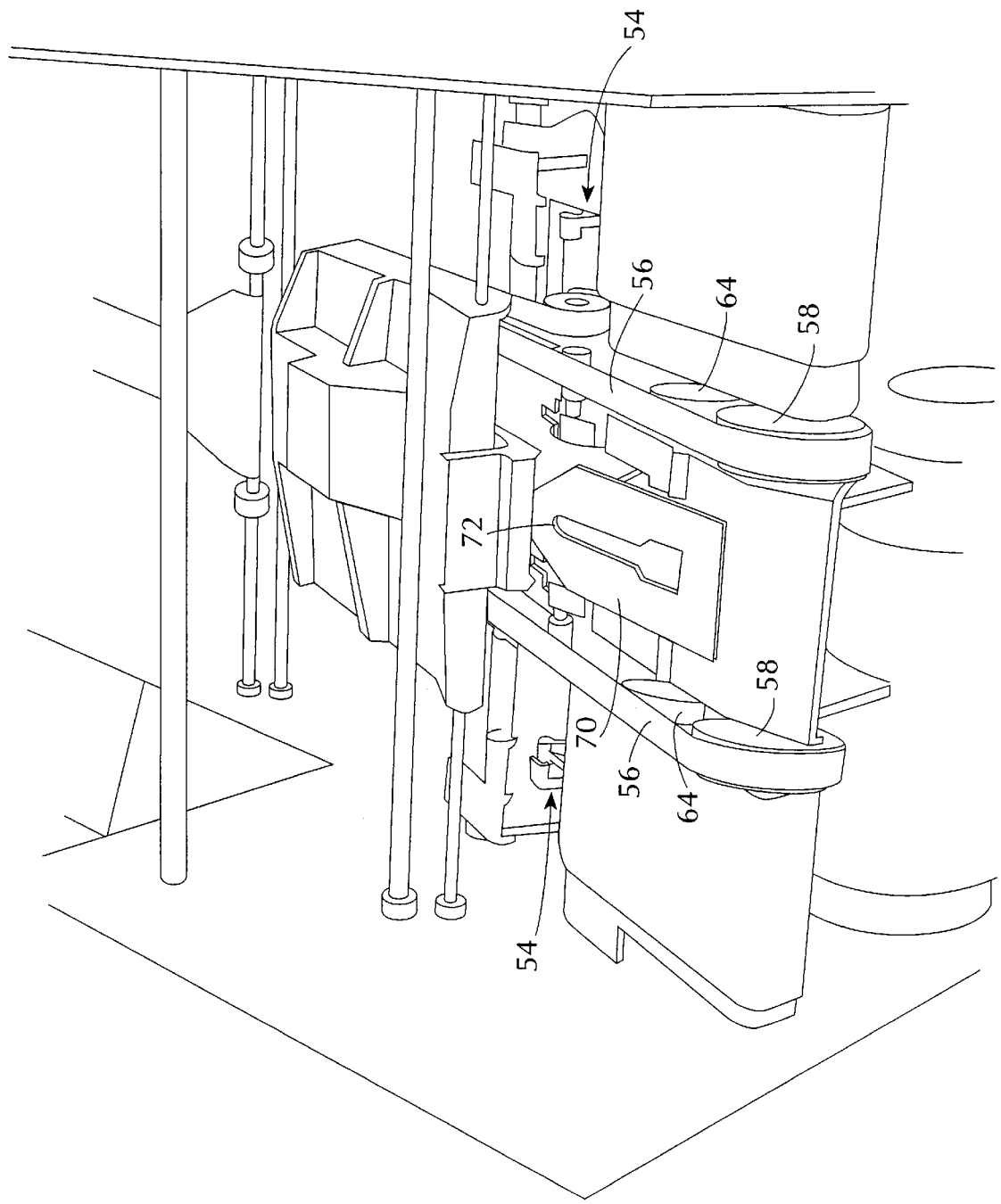
FIG. 3 is a perspective view of a portion of the envelope inserting machine shown in FIG. 1 looking from the insert material storing, feeding and separating module, with the envelope hopper and the envelope flapper at the right end of the machine removed to reveal detail therebeneath.

Referring now to FIGS. 2 and 3, it will be seen that the envelope storing, feeding and separating module further includes suitable guide members 23 and 24 which define a feed path for envelopes E that are moved from the hopper 18 by the feeder/separator unit 20. In known manner, the envelopes E are stored in the hopper 18 with the bottom edges resting on the floor of the hopper and the flaps of the envelopes closed, and the envelopes are fed through a known flapping device, designated generally by the numeral 26, in which the flaps of the envelopes are opened as they are fed through the flapping device 26 by a pair of cooperating feed rollers 28 and 30. Another suitable guide member (not shown) cooperates with a lower flange 32 of the guide member 24 to direct the bottom edge of the envelope around the bottom of the feed roller 30 and into a means defining an envelope inserting position which is located generally beneath hopper 18. The means defining the envelope inserting position, as indicated by the envelope E shown in FIG. 2 with the flap F thereof shown in the open position, comprises a suitable plate or deck 34 suitably mounted on a frame portion of the envelope inserting module 12, and a laterally extending plate 35 which forms a back stop for an upper portion of the envelope E adjacent the throat to prevent the upper panel of the envelope from rising above a predetermined plane while the throat is being opened. A pair of laterally spaced feed belts 36 extends around longitudinally spaced rollers 38 and 40 disposed adjacent opposite ends of the envelope inserting position, suitable drive rollers 42 and tensioning rollers 44 so that the belts 36 receive the envelopes from the feed rollers 28 and 30 and convey the envelopes fully into the inserting position until the bottom edge of the envelopes abut a pair of suitable laterally spaced stop members 46. The stop members 46 are downwardly extending fingers connected to levers 48 pivotally mounted as by the pins 50 to a portion of the frame of the module 12, the levers being suitably solenoid actuated so as to raise the stop members 46 from the solid line position to the dotted line position shown in FIG. 2 after a collation of insert material, as further described below, has been inserted into the envelope. When the stop members 46 are raised, the envelope E is moved toward the right as viewed in FIG. 2 by the belts 36 and is ejected from the machine by suitable backup pressure rollers 52 positioned over the rollers 40.

As will be described in more detail hereinbelow, a pair of outer envelope throat opening claw assemblies are disposed in the inserting module 12 adjacent the outer ends of the envelope E when in the inserting position, each of which has a claw moveably mounted therein and means for moving the claw into the throat T of the envelope adjacent the outer ends thereof. Thus, the claw assemblies, designated generally by the reference numeral 54 in FIGS. 2 and 3, are suitably mounted on the frame of the envelope inserting module 12 so as to be closely adjacent to the entry end of the envelope inserting position, as best seen in FIG. 2. The construction and operation of the claw assemblies 54 will be further described below, it being sufficient at this point to understand only that the claw assemblies 54 operate to open the outer end portions of the throat of an envelope in timed sequence with the arrival of successive envelopes at the insert position by the belts 36.

Referring still to FIGS. 2 and 3, the envelope inserting module 12 includes a pair of laterally spaced feed belts 56 which extend around a pair of longitudinally spaced rollers 58 ad 60. A pressure roller 62 is positioned over each of the belts 56, and a backup roller 64 supports each of the belts 56 opposite the pressure rollers 62 to support the belts at the point where the pressure rollers 62 press insert material into firm driving engagement with the upper surface of the belts 56. The belts 56 also extend around suitable drive rollers 66 and tensioning rollers 68.

As best seen in FIG. 3, an envelope throat opening center tongue assembly 69 is mounted in the inserting module 12 intermediate the insert feeding belts 56 and in substantial alignment with the center of the throat of an envelope in the inserting position. The center tongue assembly 69 includes a throat opening tongue 70, the forward end 72 of which is in generally lateral alignment with the outer claw assemblies 54. Again, as with the claw assemblies 54, the manner in which the center tongue 70 is mounted and the operation of the tongue assembly 69 will be fully described below, it being sufficient at this point to understand only that the tongue 70 operates in synchronism with operation of the outer claw assemblies 54 to open the center portion of the throat of successive envelopes, again in timed sequence with the arrival of the envelopes at the insert position by the belts 36.

Figure 5:
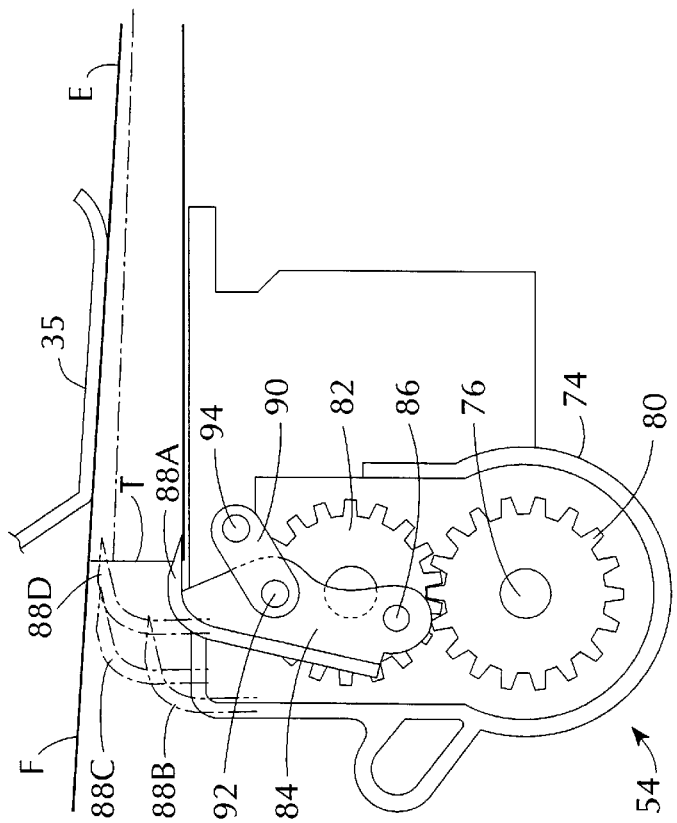
FIG. 5 is a view similar to FIG. 4 but showing the positions of the throat opening claw during a complete cycle of operation of the claw assembly.
Figure 4:
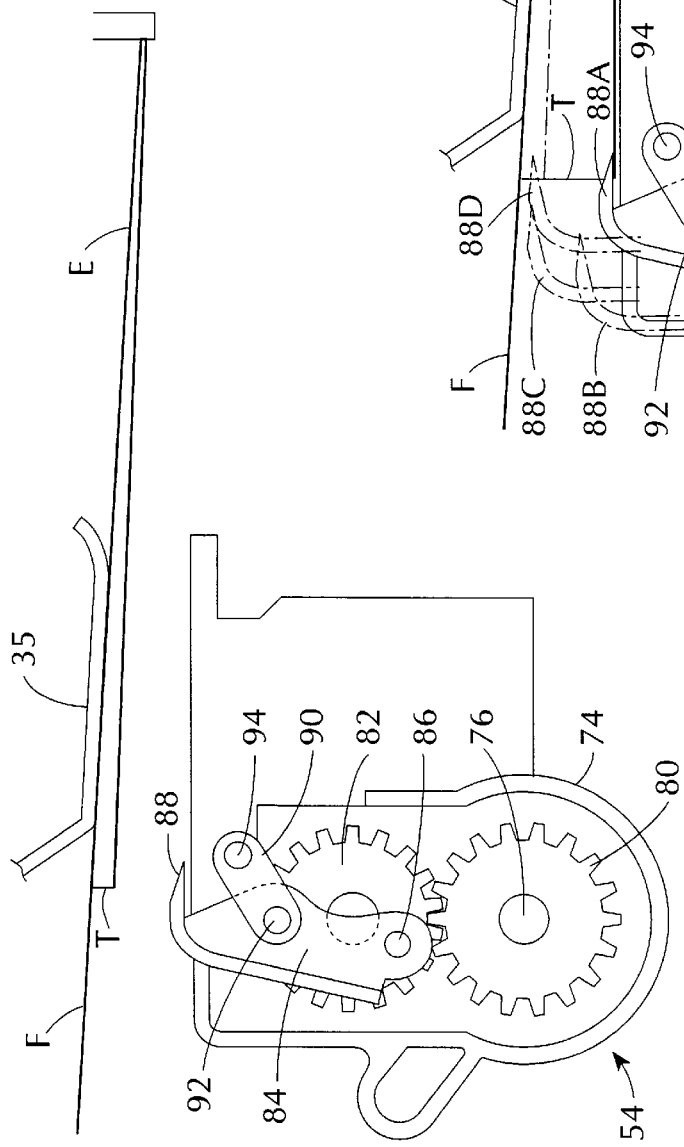
FIG. 4 is a side view of one of the outer claw assemblies shown in its normal or home position.

With reference now to FIGS. 4 through 6, the outer claw assemblies 54 are known in the art and are virtually identical to those shown and described in U.S. Pat. No. 5,517,797, and assigned to the assignee of this application. Therefore, only so much of the structure and operation of the claw assemblies 54 as is necessary to an understanding of the invention is shown and described herein. Thus, the claw assemblies 54 each comprise a housing 74 suitably mounted on a portion of the frame of the envelope inserting module 12. A drive shaft 76 is suitably rotatably mounted in the frame of the inserting module 12 (FIG. 7) and extends from one claw assembly 54 to the other. A gear 78 (FIG. 7) is mounted on the shaft 76 by which it is rotated to drive both the claw assemblies 54 and the center tongue assembly hereinafter described. Each of the claw assemblies 54 includes a drive gear 80 mounted on the shaft 76 for rotation therewith, and a driven gear 82 which is driven by the drive gear 80.

The lower end of an upstanding link 84 is eccentrically pivotally connected to the driven gear 82 as by a pivot pin 86, the link 84 having a substantially right angled claw 88 on the upper end thereof. One end of another link 90 is pivotally connected to the link 84 as by a pivot pin 92 disposed at an intermediate location on the link 84 between the pivot pin 86 and the claw 88. The other end of the link 90 is pivotally connected as by a pivot pin 94 to a portion of the housing 74.

The construction and arrangement of the links 84 and 90, and the pivotal connections 92 and 94 therebetween, as well as the pivotal connection 86 between the lower end of the link 84 and the gear 82, is such that upon rotation of the shaft 76 and the drive gear 80, the lower end of the link 84 is driven in an orbital path commensurate with the orbital path of the pivot pin 86 about the axis of the gear 82. However, since the link 84 is connected to the link 90 at the pivot point 92, the upper end of the link 84 which carries the claw 88 is constrained to move in an orbital path that is indicated by the solid line position designated 88A, and the three dotted line positions designated 88B, 88C and 88D respectively, as shown in FIG. 5.

It should be clear without further description that the position of the claw 88 shown in FIG. 4, and in the solid line position 88A in FIG. 5, represents the home position of the claw 88 both at the beginning of an inserting cycle when an envelope E has just reached the envelope inserting position, as shown in FIG. 4, and when the claw 88 has completed a throat opening cycle of operation and has opened the throat T of the envelope E in the inserting position as shown in FIGS. 5 and 6. The dotted line positions 88B, 88C and 88D indicate the approximate orbital path of the claw 88 in moving from the home position through the three successive dotted line positions and back to the home position during one revolution of the drive shaft 76 and the drive gear 80, during which the claw 88 first moves rearwardly and upwardly from the position 88A to the position 88B, then further upwardly to an upper most position 88C, also shown in FIG. 6, then forwardly and into the throat T of the envelope E to the position 88D, and finally downwardly back to the home position 88A to open the throat T.

Referring now to FIGS. 7 through 10, the tongue 70 is supported by a tongue mounting means, designated generally by the reference numeral 100, which supports the tongue 70 for compound movement that causes the forward edge 72 of the tongue to move into and open the center portion of the throat of an envelope disposed in the inserting position. The tongue mounting means, further described below, comprises a four element linkage assembly in which three links and the tongue are pivotally connected together to form a parallelogram, with the link opposite to the tongue being pivotally connected to a portion of the inserting machine. By drive means also further described below, when horizontal and vertical components of motion are imparted to the parallelogram, the tongue 70 is moved in both horizontal and vertical directions such that the forward edge 72 follows an orbital path of motion somewhat similar to that followed by the claws 88 as illustrated in FIG. 5, so that the forward edge 72 and a forward portion of the tongue 70 enter the throat T of the envelope E and open it a predetermined distance.

Figure 7:
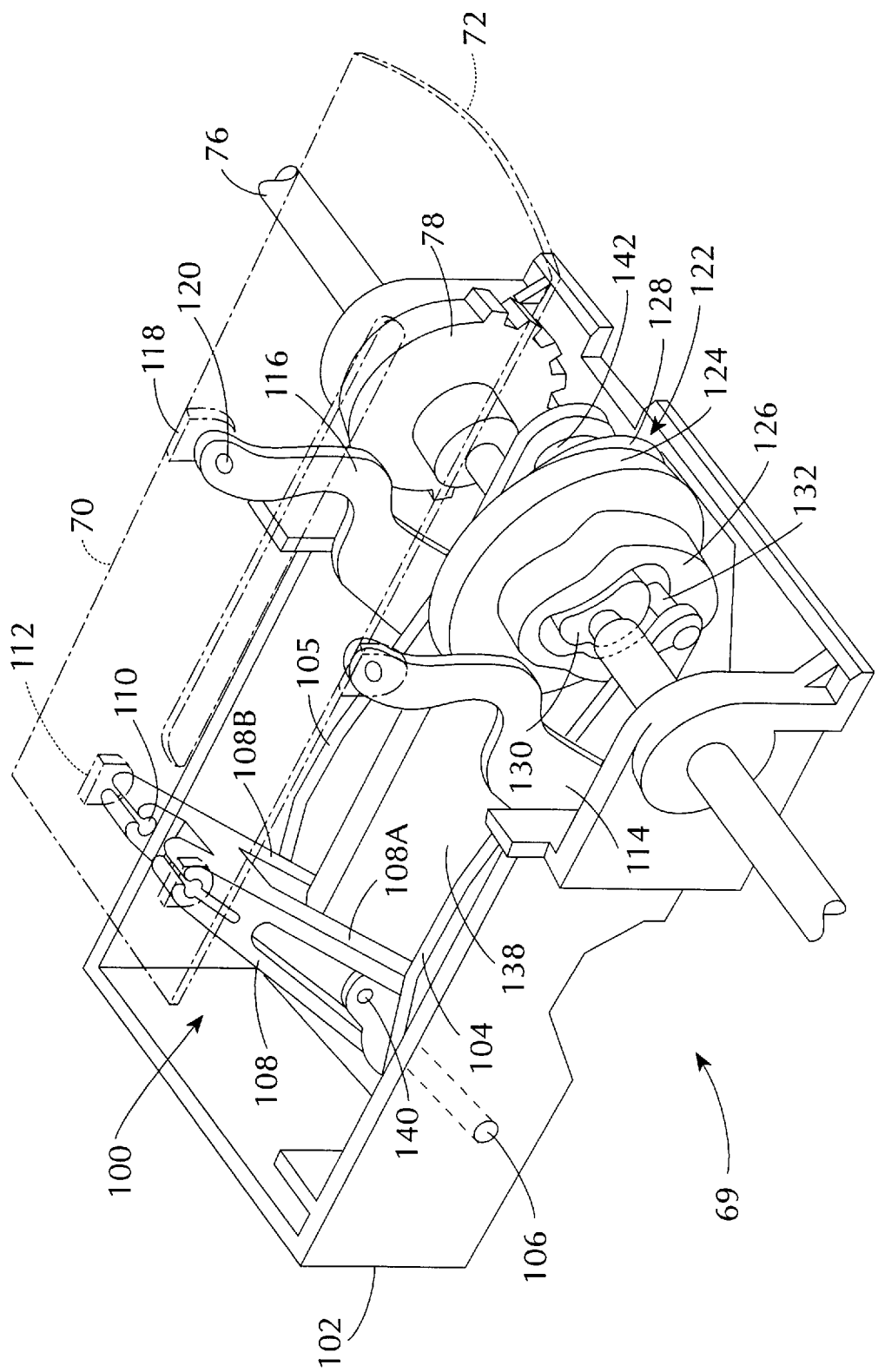
FIG. 7 is a perspective view of the four bar linkage assembly that drives the center envelope throat opening tongue through the positions illustrated in FIG. 5.
Figure 8:
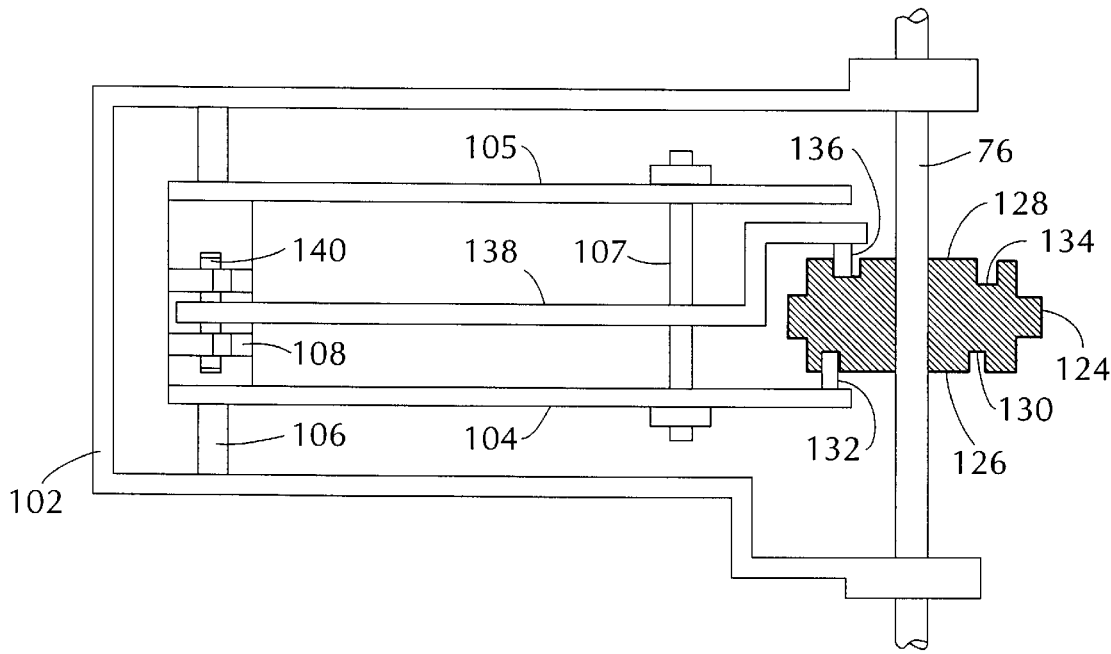
FIG. 8 is a top view, partly in section, of the four bar linkage assembly shown in FIG. 7.

Thus, as best seen in FIG. 7, the entire tongue mounting means 100 is mounted as hereinafter described in a generally rectangular frame 102 which is suitably mounted in a portion of the inserting module 12 such that the tongue 72 is in substantial lateral alignment with the center of the throat T of an envelope E disposed in the inserting position, as seen in FIG. 3. The tongue mounting means 100 comprises at least one, but, as further explained below, preferably a pair of laterally spaced apart elongate right and left lower links 104 and 105 respectively looking in a direction toward the forward edge 72 of the tongue 70. The rear ends of the lower links 104 and 105 are pivotally connected to the frame 102 by means of a pivot shaft 106 which extends from one side of the frame 102 to the other. The lower links 104 and 105 extend forwardly in a generally horizontal orientation from the pivot shaft 106, and terminate adjacent the main drive shaft 76, as further explained below.

The tongue mounting means 100 further comprises a first generally vertically oriented rear link 108 pivotally connected at its lower end to the pivot shaft 106, and is suitably pivotally connected at its upper end to the lower surface of the tongue 70 adjacent the rear end thereof, as by a pin 110 which passes through apertures in the upper end of the link 108 and downwardly projecting tabs 112 connected to the lower surface of the tongue 70.

The tongue mounting means 100 further comprises at least one, but again as explained below, preferably a pair of second, laterally spaced apart, generally vertically oriented right and left forward links 114 and 116, again looking in a direction toward the forward edge 72 of the tongue 70. The upper ends of the forward links 114 and 116 are also suitably pivotally connected to the lower surface of the tongue 70 generally adjacent the midpoint thereof, in a manner similar to that for the upper end of the rear link 108, as by the downwardly projecting tabs 118 and the pins 120. The lower ends of the forward links 114 and 116 are pivotally connected to the lower links 104 and 105 respectively by means of a shaft 107 (FIG. 8) which extends laterally between the lower links 104 and 105 at a location spaced rearwardly from the forward end of the lower links 104 and 105. It will be understood that the pair of right and left lower links 104 and 105,.and the pair of right and left forward links 114 and 116, both function as single links since the pair of lower links 104 and .105 are both connected to the pivot shaft 106, and the pair of forward links 114 and 116 are both connected to the tongue 70. However, by providing two lower links 104 and 105 and two forward links 114 and 116, the tongue mounting means 100 is better stabilized for smoother operation and provides greater stability for the tongue 70 in that it is supported at three locations rather than two.

From the foregoing, it will be seen that the lower links 104 and 105, the rear link 108, the pair forward links 114 and 116, and the tongue 70 constitute the above mentioned four element linkage assembly in that all of the connections of the links, both to each other and to the tongue, are pivotal so that all of the elements can move relative to each other in the manner yet to be described.

Figure 9:
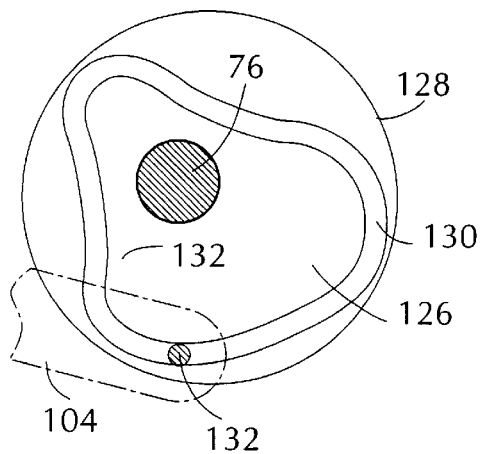
FIGS. 9 and 10 are right and left side views of the cam assembly that drives the four bar linkage assembly shown in FIGS. 7 and 8.
Figure 10:
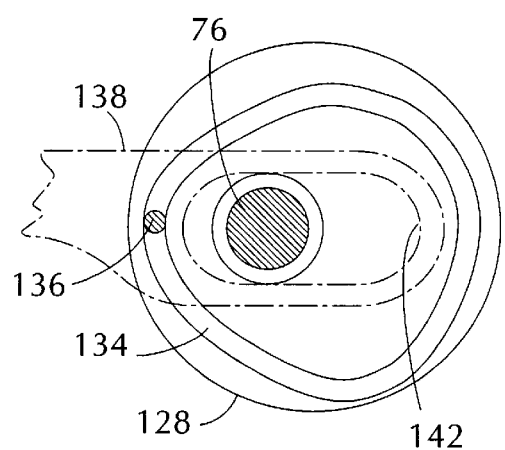
Figure 11:
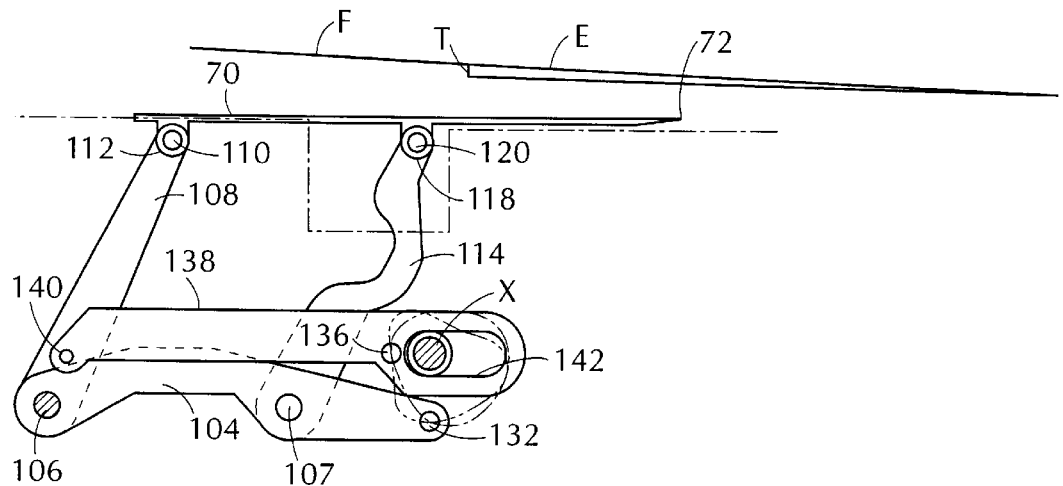
FIG. 11 is a simplified side view of the four bar linkage assembly shown in FIG. 10, and showing the parts in the home position and with an envelope having just arrived at the inserting position.
Figure 12:
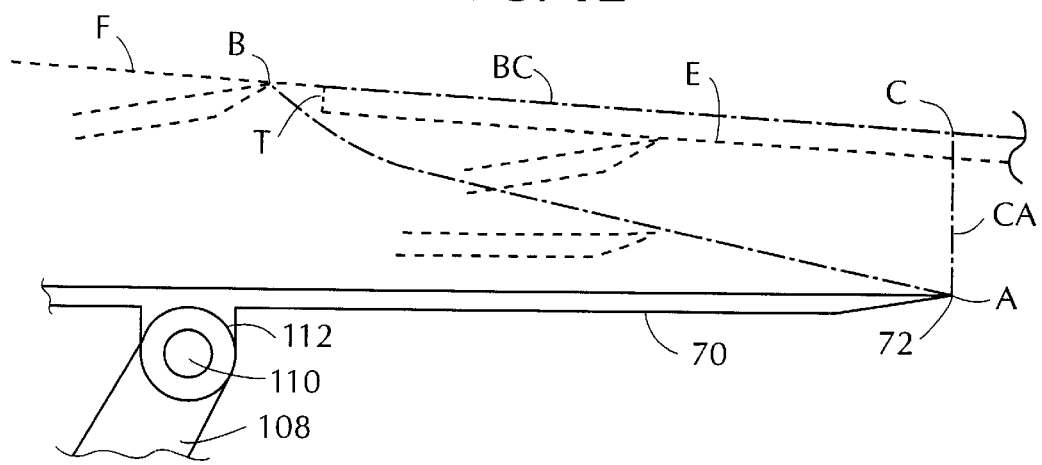
FIG. 12 is a diagrammatic view illustrating the orbital path followed by the forward edge of the tongue during a complete cycle of operation.

With reference still to FIGS. 7 through 10, the tongue mounting means 100 is moved through the aforementioned compound motion to move the forward end 72 of the tongue 70 into the throat of an envelope by an actuating means, designated generally by the reference numeral 122 in FIGS. 11 and 12. The actuating means 122 comprises a cam means which is preferably formed as a unitary cam element 124 fixedly mounted on the drive shaft 76 for rotation therewith, the cam element 124 having oppositely facing right and left surfaces 126 and 128 respectively, again looking in a direction toward the forward edge 72 of the tongue 70. It should be apparent that separate cam elements could be utilized to perform the function of each of the cam surfaces 126 and 128 of the unitary cam element 124.

With reference still to FIGS. 7 through 10, the right cam surface 126 is provided with a cam trace 130, in the form of a groove that is suitably formed into the surface of the cam element 124 and having the general configuration shown in FIG. 9. A pin 132 is mounted on the forward end of the lower right link 104 and extends into the trace 130, and functions as a cam follower so as to be moved in a generally vertical direction to impart generally vertical movement to the forward end of the link 104, which in turn causes vertical movement of the pair of forward links 114 and 116 via the shaft 107. In a similar manner, as seen in FIG. 10, the left cam surface 128 is provided with a cam trace 134, which is also in the form of a groove that is machined into the surface of the cam element 124 and having the general configuration as shown in FIG. 10. Another pin 136 is mounted adjacent the forward end of an intermediate link 138 and extends into the trace 134, and also functions as a cam follower so as to be moved in a generally horizontal direction to impart generally horizontal movement to the intermediate link 138. The intermediate link 138 extends generally horizontally from the drive shaft 76 to the rear vertically oriented link 108, to which it is pivotally connected by means of the pin 140. As best seen in FIG. 7, the rear link 108 is bifurcated so that the rear end of the intermediate link 138 can be connected between the legs 108A and 108B of the link 108. The forward portion of the intermediate link 138 is provided with a horizontally oriented elongate aperture 142 through which the drive shaft 76 extends, the purpose of this aperture being to form a sliding support for the forward end of the intermediate link 138 as it is moved in a horizontally reciprocating movement.

A complete cycle of operation of the center tongue assembly will now be described with reference to FIGS. 11 through 21. In the description that follows, reference will be made simultaneously to FIGS. 12 and 14A through F, as well as those of FIGS. 15 through 21 which correspond to the critical cam and tongue positions shown in FIGS. 12 and 14A through F.

FIG. 11 represents the home position of the tongue assembly parts at the beginning of a cycle of operation of the envelope inserting machine 10. Thus, in this position, an envelope E is shown in the inserting position as shown in FIG. 2, and the tongue 70 is in its forward most and lowest position underlying an upper portion of the envelope adjacent the throat T. The angular position of the cam element 124 is such that the cam follower 132 is in its lowest position in the cam trace 130, as seen in FIGS. 9 and 14A, and the cam follower 136 is in its forward most position in the cam trace 134, as seen in FIGS. 10 and 14B.

Figures 14A, 14B:
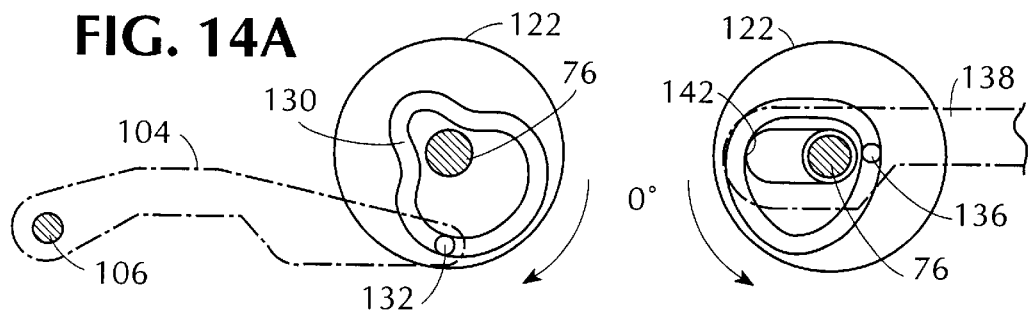
FIGS. 14A through 14F are fragmentary right and left side views similar to FIGS. 9 and 10 showing the cam assembly in three different positions of rotation which represent critical changes in the direction of movement of the center tongue through the orbital path shown in FIG. 12, except that FIGS. 14B, 14D and 14F are oriented 180° from FIG. 10.

At an appropriate moment after the envelope E reaches the inserting position as determined by the envelope stop elements 46, a suitable microprocessor, which controls all of the functions of the envelope inserting machine 10 in known manner, causes the shaft 76 to commence rotation is a clockwise direction as viewed in FIGS. 9, 11 and 14A, C and E, thereby rotating the cam traces 130 and 134 therewith, which in turn cause the cam followers 132 and 136 to move. As seen in FIGS. 14B. D and F and 15, the cam trace 134 causes the cam follower 136 to move rearwardly, as indicated by the arrow 143, thereby moving the intermediate link 138 rearwardly as indicated by the arrow 144. Since the intermediate link 138 is pivotally connected to the rear link 108 by the pin 140, the rearward movement of the intermediate link 138 causes the rear link 108 to rotate in a counter clockwise direction about the pivot shaft 106, as indicated by the arrow 146. Further, since the rear link 108 is pivotally connected to the tongue 70 by the pivot pin 110, the angular movement of the rear link 108 moves the tongue 72 rearwardly, as indicated by the arrow 148, and since the tongue 70 is also pivotally connected to the forward links 114 and 116 by the pivot pins 120, the tongue 70 also moves these links in a counter clockwise direction about the pivot shaft 107, as indicated by the arrow 150. The foregoing motions of the parts described occur during approximately the first 80° of rotation of the shaft 76 and the cam element 124.

With reference now to FIGS. 14A through D and 15, simultaneously with the foregoing rotation of the cam element 124 and cam traces 130 and 134, the cam trace 130 causes the cam follower 132 to move upwardly, as indicated by the arrow 152, thereby moving the lower links 104 and 105 in a counter clockwise direction about the pivot shaft 106, as indicated by the arrow 154. Since the forward links 114 and 116 are both pivotally connected to the lower links 104 and 105 respectively, the counter clockwise movement of the lower links 104 and 105 raises the forward links 114 and 116, as indicated by the arrow 155, which in turn moves the forward portion of the tongue 70 in a counter clockwise direction about the pivot pin 110 connecting the rear portion of the tongue 70 with the rear link 108, which in turn causes the forward edge 72 of the tongue 70 to rise, as indicated by the arrow 156.

Figure 15:
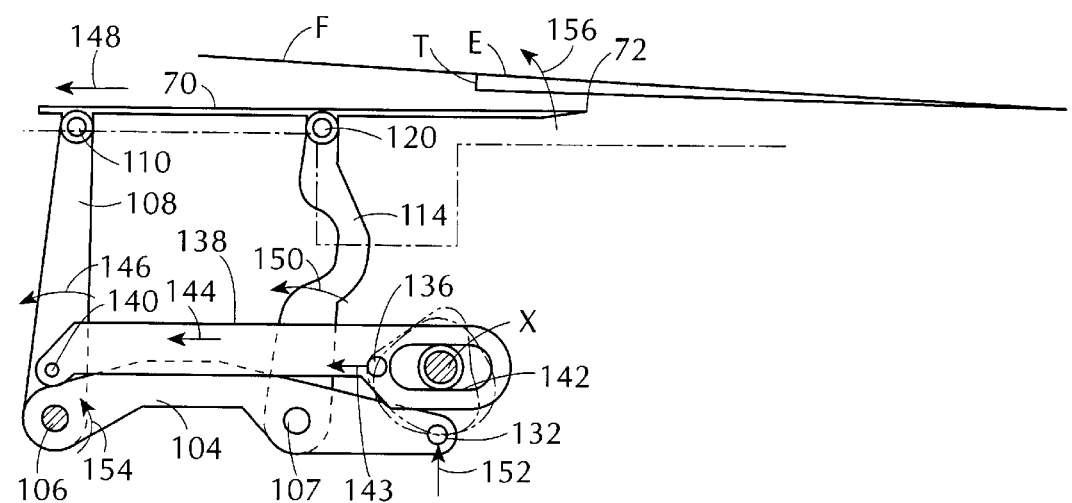
FIGS. 15 through 21 are simplified side views similar to FIG. 7 showing the four bar linkage assembly driving the center envelope throat opening tongue through the various positions illustrated in FIGS. 5.

Thus, with reference to FIG. 12, it will be seen that the movements of the parts caused by rotation of the cam traces 130 and 134 cause the tongue 70 to move from the position shown in solid lines to approximately the dotted line position in which the forward edge 72 of the tongue 70 has moved from the position A to approximately half way along the line AB, during which the planar orientation of the tongue 70 remains substantially unchanged from that shown in FIGS. 12 and 15.

Figure 16:
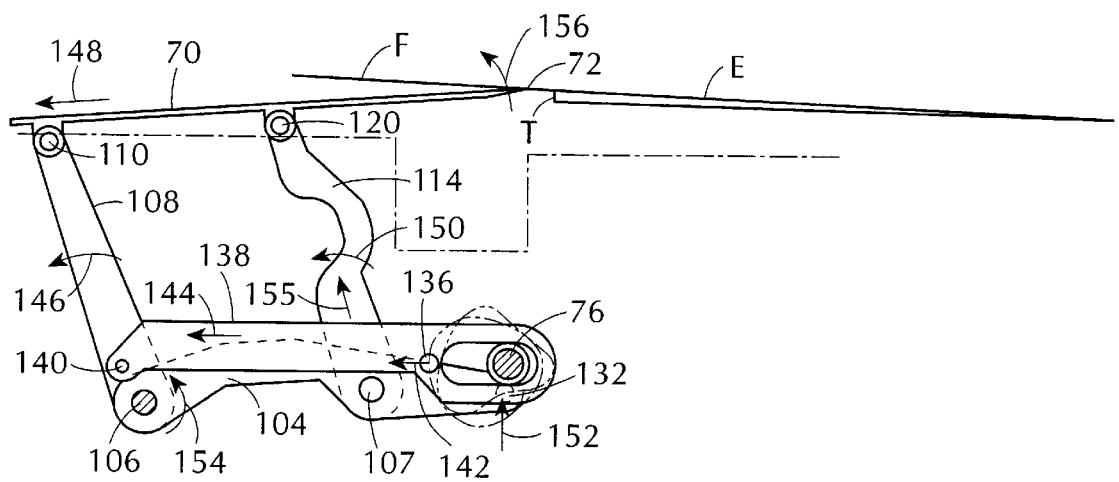
Figure 17:
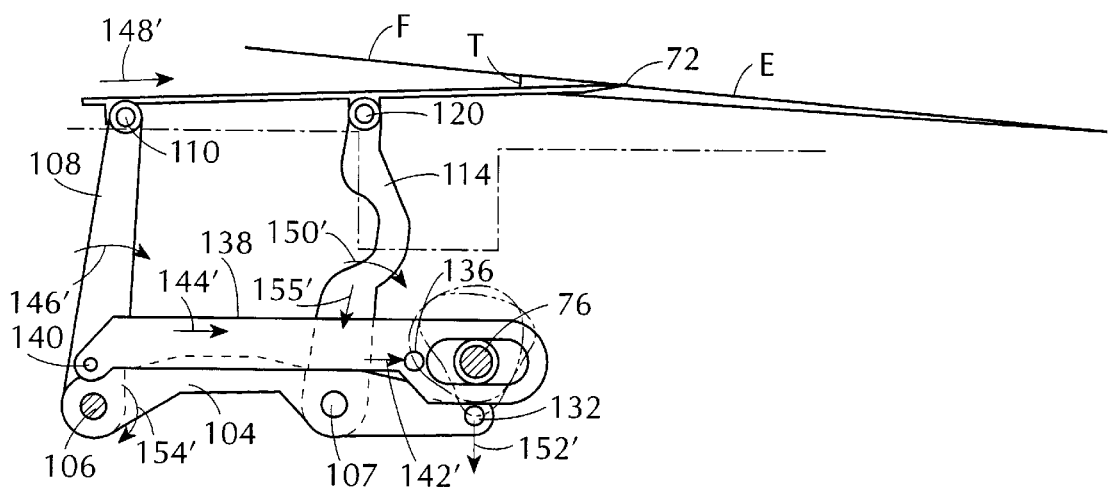

Further rotation of the cam element 124 and the cam traces 130 and 134 through another approximately 80° of rotation cause continued movement of all of the parts as described above until the tongue 70 reaches its upper most and rear most position, as seen in FIG. 16 and the next dotted line position in FIG. 12, in which the forward edge 72 has traversed the remainder of the line AB and is now at the position B in FIG. 12, and the planar orientation of the tongue shifts slightly in a counter clockwise direction while the forward edge 72 moves along the curved portion of the line AB. It will also be seen that the position B lies in the plane of the upper panel of the envelope E and is disposed slightly beyond the throat T so as to press lightly against the under side of the flap F. At this point the cam element 124 has rotated approximately 160° to the positions shown in FIGS. 14C and D.

Figures 14C, 14D:
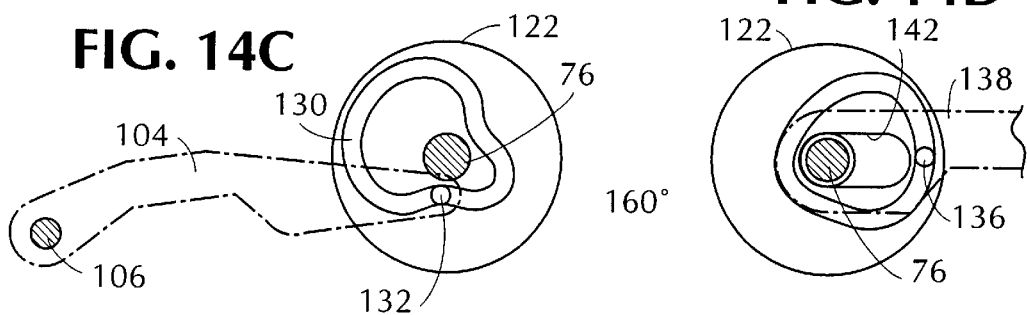
Figures 14E, 14F:
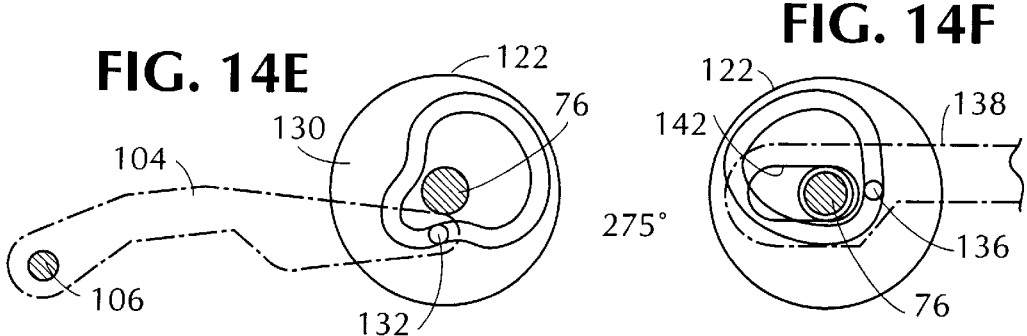

FIGS. 17 through 21 show a progression of the positions of the tongue 70 and the parts of the tongue mounting assembly 100 during continued rotation of the shaft 76 and the cam element 124 from the 160° position shown in FIGS. 14C and D and 16, which causes the cam traces 130 and 134 to move the cam followers 132 and 136 in the opposite directions from that described above in connection with FIGS. 11. 15 and 16. Thus, the cam trace 134 causes the cam follower 136 to move in a forward direction, as indicated by the reverse direction arrow 142', thereby moving the intermediate link 138 forwardly as indicated by the reverse direction arrow 144'. Due to the same pivotal connections as described above, the forward movement of the intermediate link 138 causes the rear link 108 to rotate in a clockwise direction about the pivot shaft 106, as indicated by the arrow 146', which in turn moves the tongue 72 forwardly, as indicated by the arrow 148', which in turn again moves the forward links 114 and 116 in a clockwise direction about the pivot shaft 107, as indicated by the arrow 150'. The configuration of the cam traces 130 and 134 during this segment of rotation of the cam element 124 is such that the tongue 70 moves the forward edge 72 into the throat T of the envelope E with the tongue 70 still lying in approximately the same plane as it had in the rear most position shown in FIG. 16. The foregoing motions of the parts described occur during approximately an additional 57° of rotation of the cam element 124.

With reference to FIGS. 14C through F and 17, simultaneously with this segment of rotation of the cam element 124 and the cam traces 130 and 134, the cam trace 130 causes the cam follower 132 to move downwardly, as indicated by the arrow 152', thereby moving the lower links 104 and 105 in a clockwise direction about the pivot shaft 106, as indicated by the arrow 154'. Again, since the forward links 114 and 116 are both pivotally connected to the lower links 104 and 105 respectively, the clockwise movement of the lower links 104 and 105 causes the forward links 114 and 116 to commence a slight downward movement, as indicated by the arrow 155'. However, as mentioned above regarding the forward motion of the tongue 70 from the cam trace 134 and the cam follower 136, again the configuration of the cam traces 130 and 134 are such that the tongue 70 is constrained to move in substantially the same plane as that shown in FIG. 16 while moving to the position shown in FIG. 17. This is further illustrated in FIG. 12 in which the tongue is shown moving from the dotted line position in which the forward edge 72 is at the position B to a position approximately half way along the line BC.

Figure 18:
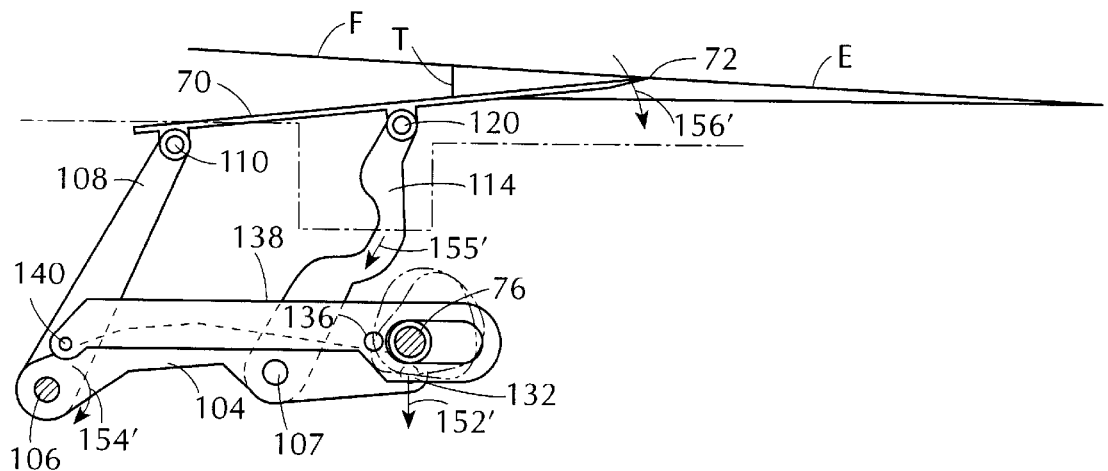

Again, further rotation of the cam element 124 and the cam traces 130 and 134 through approximately another 58° of rotation causes continued movement of all of the parts described above until the tongue 70 reaches the end of its movement along the line BC, as seen in FIG. 18, and the dotted line position in FIG. 12, in which the forward edge 72 is now at the position C in FIG. 12. It should again be noted that during this second approximately 58° of rotation of the cam element 124, the planar orientation of the tongue 70 has remained substantially unchanged. At this point the cam element 124 has rotated approximately 275° to the position shown in FIGS. 14E and F.

Figure 13A:
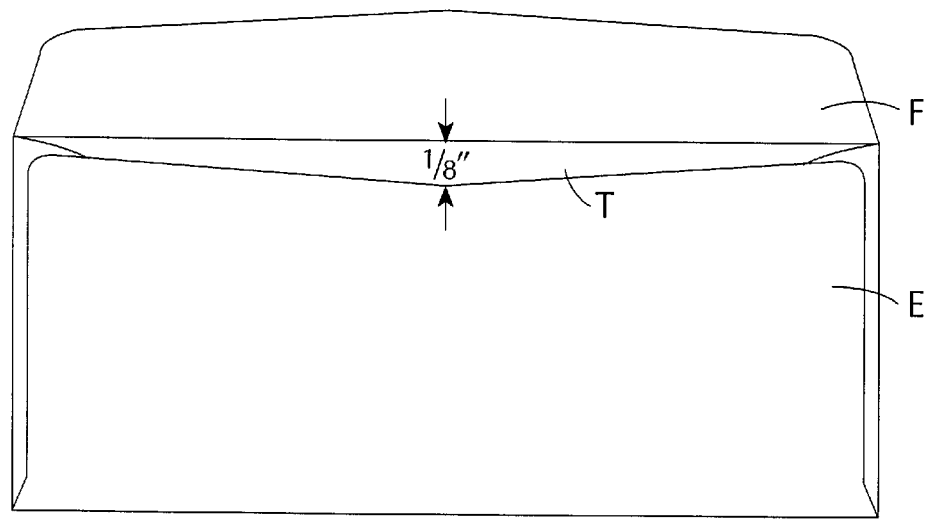
FIGS. 13A and 13B illustrate a typical extreme range of depths of envelope throats that the center tongue is intended to open without the necessity for any adjustment of the tongue mounting assembly.
Figure 13B:
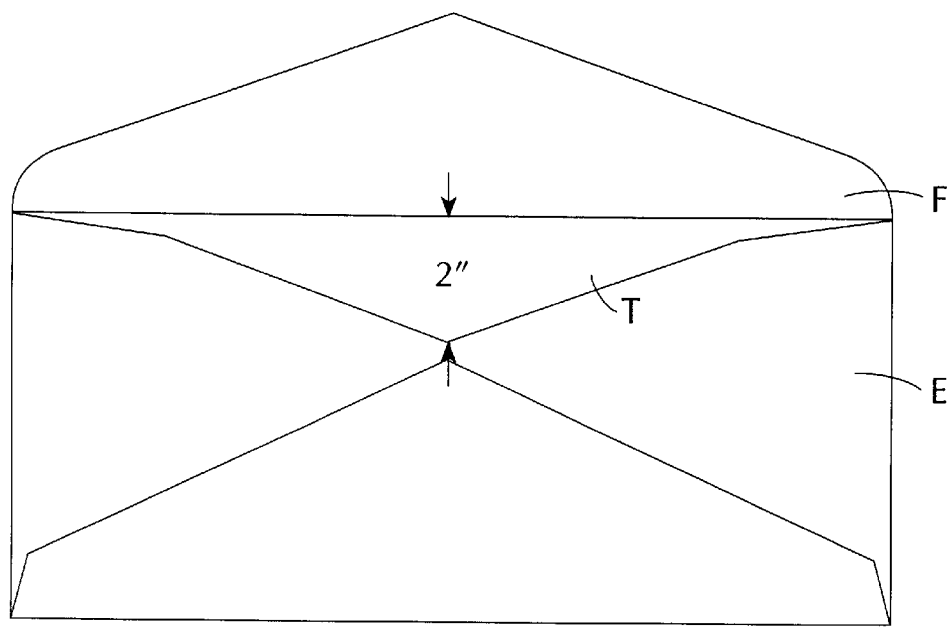

During the foregoing movement of the tongue 70 in which the forward edge 72 moves from the position shown in FIG. 16 to that shown in FIG. 18, which corresponds to the positions B and C in FIG. 12, the forward edge 72 enters the throat T and moves gently along the inner surface of the upper or front panel of the envelope E. The configuration of the traces 130 and 134 have been carefully customized to cause a gentle scraping of the forward edge 72 along the inner surface of the flap F and the front panel of the envelope E, that is coextensive with the line BC as seen in FIG. 12, with sufficient pressure to ensure that the tongue 70 enters the throat T, but with insufficient pressure to cause any damage to the envelope or to a glassine window it may have. This feature also permits the tongue 70 to open a substantial range of throat depths without the necessity of making any form of adjustment to the center tongue assembly. This is shown in FIGS. 13A and 13B which show a range of envelope throats which the center tongue assembly can open of approximately one eight of an inch to two inches.

Figure 19:
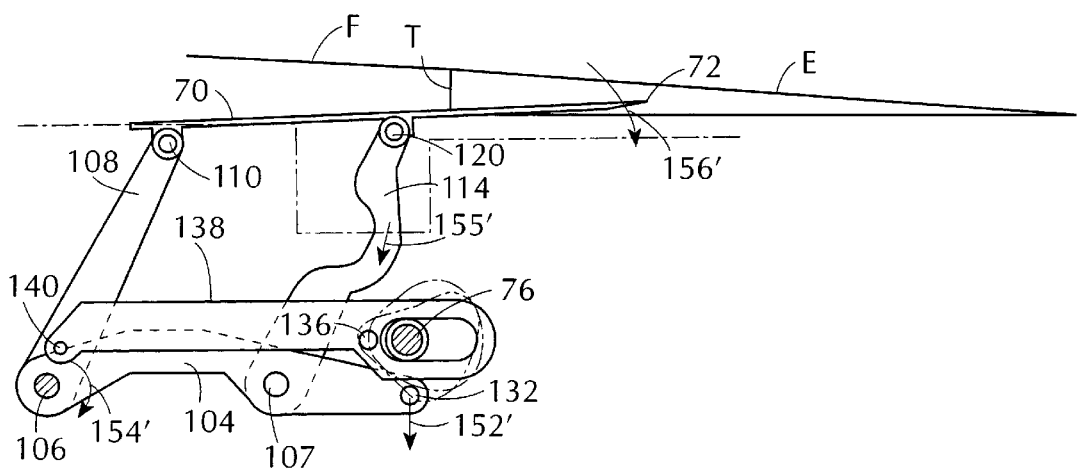

With reference now to FIG. 19, further rotation of the cam element 124 and the traces 130 and 134 cause a more pronounced downward movement of the cam follower 132, still as indicated by the arrow 152' thereby causing a corresponding more pronounced downward movement of the forward links 114 and 116, still as indicated by the arrow 155'. This more pronounced downward movement of the forward links 114 and 116 pivots the tongue 72 about the pin 110 in a clockwise direction, as indicated by the arrow 156', so that the forward edge 72 moves downwardly, with the result that the forward portion of the tongue 70 begins to open the throat T.

Figure 20:
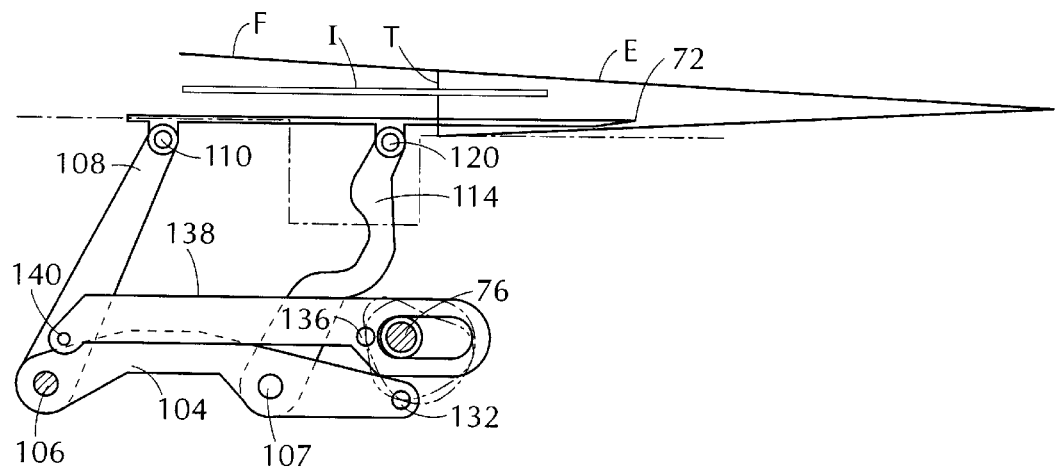

Referring now to FIG. 20, further rotation of the shaft 76 and the cam element 124 simply continues the motion described above as shown in FIG. 19 so that the throat T of the envelope E is opened to the full extent required to receive the insert material I. In addition, due to further downward movement of the cam follower 132 and the accompanying clockwise pivotal movement of the lower links 104 and 105, the tongue 70 is pivoted further in a clockwise direction to lower the front portion still further so, that the tongue 70 assumes a more horizontal position, with the result that the lower surface of the tongue 70 is now depressing a greater portion of the inner surface of the rear panel of the envelope E than is shown in FIG. 19.

Figure 21:
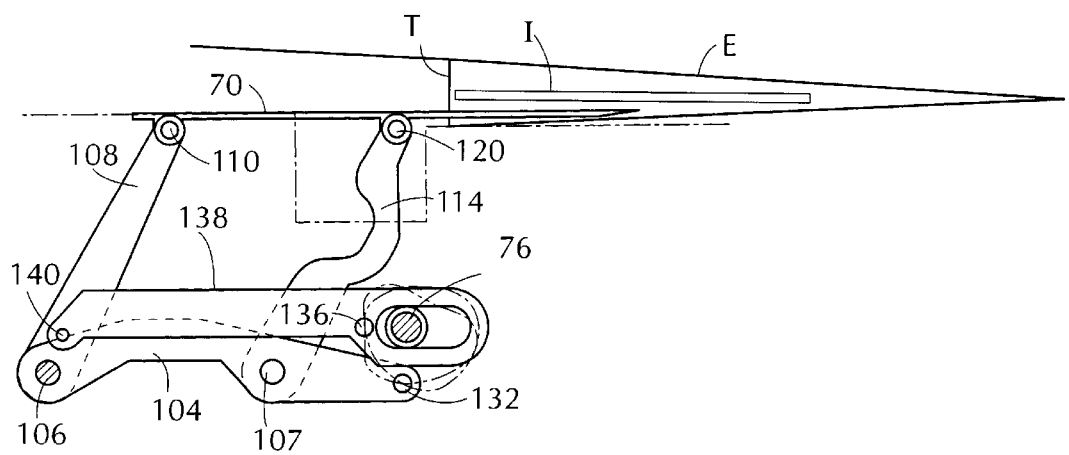

FIG. 21 shows the parts of the tongue 70 and the tongue mounting assembly 100 in the same home positions they occupied in FIG. 15, with the exception that the tongue 70 is now inside the envelope E and the throat T is being held fully open. At this point, the microprocessor control stops the rotation of the drive shaft 76 so that the parts are held in the position shown in FIG. 21. The microprocessor then actuates the inserting module 12 to cause a collation of insert material I to be moved into the envelope E through the open throat T, and to be fully inserted into the envelope as shown in FIG. 22. After this occurs, the microprocessor causes the envelope stop members 46 to raise so that the feed belts 34 and pressure rollers 52 can eject the envelope E from the inserting machine 10 for further processing.

It is to be understood that the present invention is not to be considered as limited to the specific embodiment described above and shown in the accompanying drawings, which is merely illustrative of the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

I claim:

1. An envelope throat opening mechanism for an envelope inserting machine having means for storing a plurality of envelopes, means defining an envelope inserting position in spaced relationship with said envelope storing means in which insert material is adapted to be inserted into said envelopes, and means for feeding envelopes seriatim from said storage means to said inserting position, said envelope throat opening mechanism comprising:

A. a pair of envelope throat opening claw assemblies disposed in said envelope inserting machine adjacent the outer ends of the throat of an envelope in said inserting position, each of said claw assemblies having a claw mounted therein for movement into the throat of said envelope adjacent said outer ends to open said throat to permit insert material to be inserted into said envelope, B. an envelope throat opening center tongue assembly disposed in said envelope inserting machine in substantial lateral alignment with the center of the throat of an envelope in said inserting position for opening the center portion of the throat of an envelope positioned in said inserting a position, and C. means for driving said claw assemblies and said center tongue assembly in a timed sequence with the arrival of said envelope at said envelope inserting position, whereby said claw assemblies and said center tongue assembly open the entire length of the throat of said envelope to permit insert material to be inserted into said throat without interference from any portion of said throat.

2. An envelope throat opening mechanism as set forth in claim 1 wherein said center tongue assembly comprises A. an elongate, generally rectangular throat opening tongue having a forward edge that is positioned in substantial longitudinal alignment with said claws of said claw assemblies, and B. means mounting said tongue for compound movement such that said forward edge of said tongue moves into the throat of said envelope adjacent said center thereof in response to operation of said driving means for opening said center portion of said throat.

3. An envelope throat opening mechanism as set forth in claim 2 wherein said means mounting said tongue for compound movement comprises a four element linkage assembly in which three links and said tongue are pivotally connected to form a parallelogram, the link opposite said tongue being pivotally connected to a portion of said inserting machine, and means for oscillating said opposite link about said pivotal connection and the remaining two links about said tongue to move said tongue in both horizontal and vertical directions to cause said compound movement of said forward edge of said tongue in a prescribed orbital path.

4. An envelope throat opening mechanism as set forth in claim 3 wherein said four element linkage assembly comprises A. at least one elongate lower link extending generally horizontally and being pivotally connected to said inserting machine adjacent the rear end of said link, B. at least one first upstanding link pivotally connected to said inserting machine coaxially with the pivotal connection of said lower link to said inserting machine, C. at one second upstanding link pivotally connected to said lower link at an intermediate location spaced from the rear end of said lower link, and D. said tongue being pivotally connected to said first and second upstanding links, such that said tongue is supported thereby for movement by said upstanding links.

5. An envelope throat opening mechanism as set forth in claim 4 wherein said means for driving said claw assemblies and said mounting means for said tongue comprises A. a drive shaft rotatably mounted in said envelope inserting machine, B. actuating means for said claw assemblies and said tongue mounting means connected to said drive shaft for moving both said claws and said tongue, and C. means for rotating said drive shaft.

6. An envelope throat opening mechanism as set forth in claim 5 wherein said actuating means for said tongue mounting means comprises A. cam means mounted on said drive shaft for rotation therewith, B. first means interconnecting said cam means with said first upstanding link for oscillating said first upstanding link about said pivotal connection between said first upstanding link and said portion of said inserting machine to move said tongue in a generally horizontal reciprocating movement, and C. second means interconnecting said cam means with said second upstanding link for reciprocating said second upstanding link in a generally vertical direction simultaneously with said oscillating movement of said first upstanding link to move said forward portion of said tongue in a generally vertical reciprocating movement, whereby said forward edge of said tongue is moved through an orbital path.

7. An envelope throat opening mechanism as set forth in claim 6 wherein said cam means comprises a unitary cam element mounted on said drive shaft, said cam element having first and second cam traces formed on opposite surfaces thereof for engagement by said first and second interconnecting means.

8. An envelope throat opening mechanism as set forth in claim 7 wherein said first interconnecting means comprises
   A. an elongate intermediate link extending generally horizontally and disposed adjacent said lower links, the rear end of said intermediate link being pivotally connected to said first upstanding link adjacent said pivotal connection of said upstanding link with said inserting machine, and
   B. a cam follower mounted on the forward end of said intermediate link in a position to follow said first cam trace, said first cam trace being formed to move said intermediate link in a generally horizontal reciprocating movement upon rotation of said drive shaft and said cam means to cause said oscillatory movement of said first upstanding link to move said tongue in said generally horizontal reciprocating movement.

9. An envelope throat opening mechanism as set forth in claim 7 wherein said second interconnecting means comprises a cam follower mounted on the forward end of said lower link and facing the opposite side of said cam element in a position to follow said second cam trace, said second cam trace being formed to move said lower link in an oscillatory path about said pivotal connection to move said second upstanding link in a generally vertical direction upon rotation of said drive shaft and said cam means to move said forward portion of said tongue in said generally vertical reciprocating movement.

10. An envelope throat opening mechanism as set forth in claim 7 wherein
    A. said first interconnecting means comprises
        1. an elongate intermediate link disposed adjacent said lower link, the rear end of said intermediate link being pivotally connected to said first upstanding link adjacent said pivotal connection of said upstanding link with said inserting machine, and
        2. a cam follower mounted on the forward end of said intermediate link in a position to follow said first cam trace, said first cam trace being formed to move said intermediate link in a generally horizontal reciprocating movement upon rotation of said drive shaft and said cam means to cause said oscillatory movement of said first upstanding link to move said tongue in said generally horizontal reciprocating movement, and
    B. said second interconnecting means comprises a cam follower mounted on the forward end of said lower link and facing the opposite side of said cam element in a position to follow said second cam trace, said second cam trace being formed to move said lower link in an oscillatory path about said pivotal connection to move said second upstanding link in a generally vertical direction upon rotation of said drive shaft and said cam means to move said forward portion of said tongue in said generally vertical reciprocating movement.

11. An envelope throat opening mechanism as set forth in claim 7 wherein said cam traces are formed so as to cause said first and second interconnecting means to move said tongue in said horizontal and vertical reciprocating movements in a predetermined pattern such that said forward edge of said tongue moves in an orbital path in which said forward edge, commencing from a lower most home position, moves upwardly and rearwardly to an upper most position in which said forward edge is beyond the location of the throat of an envelope in said envelope inserting position, then moves forwardly through said throat and into said envelope for a predetermined distance, and then moves vertically downwardly back to said home position with said forward edge of said tongue inside of said envelope, whereby said throat is opened.

12. An envelope throat opening mechanism as set forth in claim 11 wherein said cam traces are further formed so as to cause said first and second interconnecting means to move said tongue in said horizontal and vertical reciprocating movements in said predetermined pattern such that the planar orientation of said tongue pivots in a counter clockwise direction during the movement of said forward edge from said home position to said upper most position to an angled orientation relative to the plane of said envelope such that said forward edge presses lightly against the under surface of the flap of said envelope, and remains in said angled orientation during said forward movement from said upper most position through said throat and into said envelope for said predetermined distance along a path that is coextensive with the interior surface of said flap and the front panel of said envelope, so that said forward edge continues to press lightly against said interior surface of said front panel of said envelope during said forward movement of said forward edge.

13. An envelope throat opening mechanism as set forth in claim 12 wherein said cam traces are further formed so at to cause said first and second interconnecting means to move said tongue in said horizontal and vertical reciprocating movement in said predetermined pattern such that said planar orientation of said tongue pivots in a clockwise direction after said forward edge of said tongue has moved into said envelope said predetermined distance to cause said forward edge to move downwardly to said lower most home position, thereby fully opening said throat.

14. An envelope throat opening mechanism as set forth in claim 13 wherein said cam traces are further formed so as to cause said first and second interconnecting means to move said tongue in said horizontally and vertically reciprocating movement in said predetermined pattern such that said predetermined distance of movement of said leading edge of said tongue during said forward movement is approximately two inches, whereby said tongue can open envelope throats ranging in depth from approximately one eighth of an inch to two inches without any adjustment in the extent of movement of said forward edge of said tongue.

* * * * *